United States Patent [19]
Swett et al.
[11] 3,761,687
[45] Sept. 25, 1973

[54] DUAL TICKET READER

[75] Inventors: Alan Swett, Milton; Nunzio Napoleone, Wellesley, both of Mass.
[73] Assignee: Dennison Manufacturing Company, Framingham, Mass.

[22] Filed: Jan. 3, 1972
[21] Appl. No.: 215,045

[52] U.S. Cl. .............. 235/61.11 E, 271/71, 271/74, 340/174.1 C, 235/61.11 D
[51] Int. Cl. ...... B65h 29/34, G06k 7/08, G06k 7/10
[58] Field of Search ............ 235/61.11 D, 61.11 E; 274/4 J; 340/174.1 C; 214/1 BH; 198/209; 353/25, 107, 117; 250/219 D, 219 DC; 271/5, 74, 71

[56] References Cited
UNITED STATES PATENTS
3,215,819 11/1965 Smith et al. .................. 235/61.11 E
3,309,667 3/1967 Feissel et al. ................. 235/61.11 E OTHER PUBLICATIONS
IBM Tech. Discl. Bull. May et al., "Random --- File," Vol. 9, No. 12, May '67 p. 1717, 1718

*Primary Examiner*—Thomas J. Sloyan
*Attorney*—Sewall P. Bronstein et al.

[57] ABSTRACT
A ticket reader constructed to read magnetically encoded tickets or punch encoded tickets, said reader having a rotatable turret, a vacuum system for controlling the movement of tickets between a ticket feed station, two read stations, one adapted to magnetically read data on a ticket and one adapted to read data punched on a ticket, and a plurality of stations adapted to receive the tickets after they have been read and interpreted.

17 Claims, 10 Drawing Figures

DUAL TICKET READER

BACKGROUND OF THE INVENTION

This invention is directed to a system for reading information coded on a ticket and is more particularly directed to a ticket reader adapted to read punch encoded information or magnetically encoded information stored on a ticket.

This invention is an improvement over the ticket reader shown in commonly owned U.S. Patent application filed on July 20, 1970, U.S. Ser. No. 56,281 entitled Ticket Reader now U.S. Pat. No. 3,689,065, issued Sept. 5, 1972. The entire disclosure in application Ser. No. 56,281 is carried forward into this application by reference hereto.

The invention herein provides additional flexibility in use over the ticket reader of the above referred to application in that two distinct types of encoded tickets can now be processed by the same machine.

The above has been accomplished by the provision of a new turret construction which facilitates the reading of punched tickets as well as magnetically encoded tickets.

This invention also includes a new and improved device for reading the presence of the punched code on the tickets as well as means for selecting which of the reading devices, that is one for reading encoded magnetic or punch encoded data, is to be activated to read the ticket.

OBJECTS OF THE INVENTION

In view of the foregoing it is an object of the invention to provide a new and improved dual purpose ticket reader.

It is a further object of the invention to provide a ticket reader capable of processing either magnetically encoded data or data punched into a ticket in a predetermined code.

Still other objects and advantages will in part be obvious and apparent from the specification. The invention accordingly, comprises the features of construction, combination of elements and arrangements of parts which will be exemplified in the construction hereinafter set forth, as well as the several steps and the relation of one or more of such steps with respect to each of the others which is exemplified in the following detailed description, and the scope of the invention will be indicated in the claims.

DESCRIPTION OF THE PREFERRED EMBODIMENT

Figure 2A:
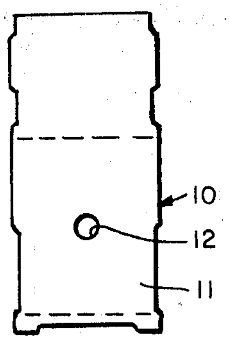
FIG. 2A is a top view of a magnetically encoded ticket which may be read by the reader of the invention.
Figure 2B:
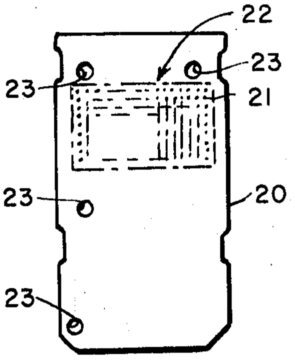
FIG. 2B is a top view of a punch or hole encoded ticket which may be read by the reader of this invention.
Figure 3:
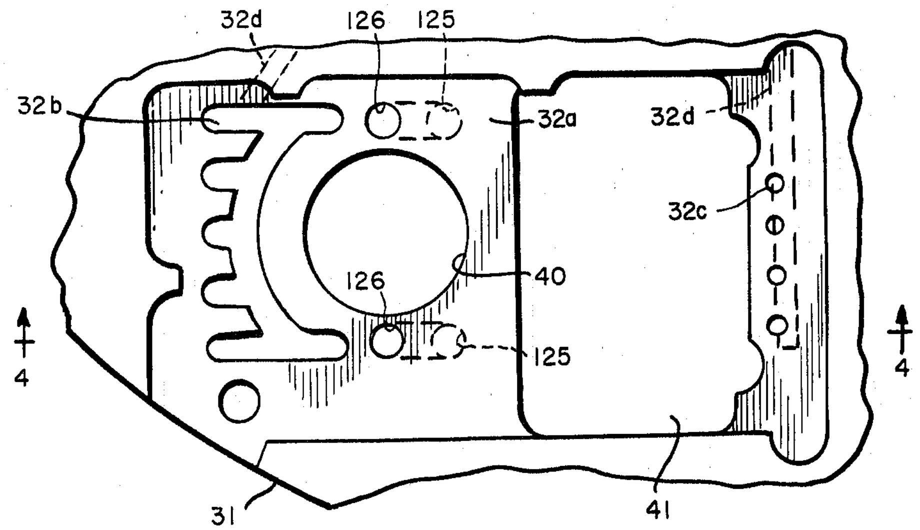
FIG. 3 is a top view showing a ticket receiver according to the invention.
Figure 4:
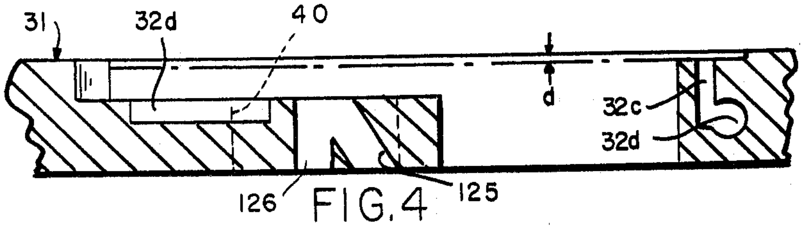
FIG. 4 is a sectional view taken along line 4—4 of FIG. 3.
Figure 5:
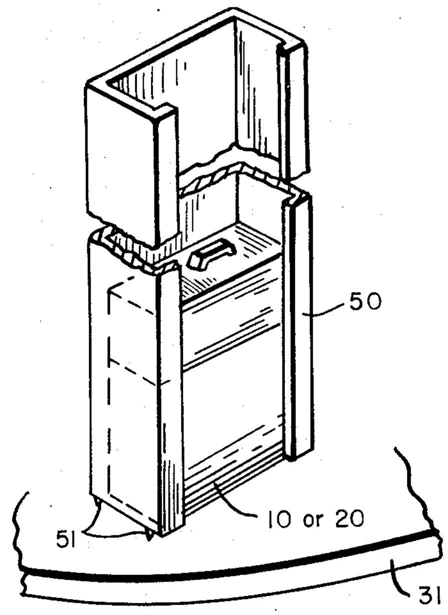
FIG. 5 is a perspective view showing an output stacker for providing tickets to the disc like turret according to the invention.

Reference should now be had to FIGS. 2A and 2B for a brief description of the types of tickets or tags which may be read by the ticket reader of this invention.

In FIG. 2A there is shown a bottom view of a control ticket 10 bearing magnetically encoded data which may be read by the magnetic reading device of the invention. At 11 the ticket includes a magnetizable layer suitable for magnetically recording data thereon and a centering aperture 12 used to locate the ticket with respect to the device for reading the information magnetically encoded or stored in the layer 11. On the top side of the ticket 10, conventional information such as type may be applied. For a more complete description of the ticket of the type shown in FIG. 2A and a device for reading the ticket and the manner in which the data is stored in circular tracks on the layer 11, reference may be had to U.S. Pat. Nos. 3,553,440 and 3,517,612 as well as the aforementioned referenced U.S. Patent application.

FIG. 2B shows another type of ticket 20 which is commonly referred to as a print punch ticket. The ticket incorporates a plurality of punched holes 21 arranged in an array 22 representing coded data. The ticket also includes enlarged holes 23, two of which are used for centering the ticket with respect to a reader for reading the data represented by the punched holes. The data may represent price and other pertinent information concerning the article to which it may be attached. The ticket may also include printed data representing price etc.

Reference should now be had to FIGS. 1, 3, 4 and 9 for a brief explanation of the reader of this invention. At 30 there is shown a frame for the reader in which there is mounted a rotatable turret or disc 31 of the type shown in the aforementioned U.S. Patent application Ser. No. 56,281.

The turret comprises a plurality of ticket receivers 32 comprising cavities recessed in the top surface **31*a* thereof. The turret also has a bottom surface and side surfaces. The ticket receivers have a bottom 32*a* having a plurality of passages 32*b* recessed therein for applying vacuum to hold to hold a ticket within the receiver 32. In addition, passages 32*c* are provided for also applying vacuum to hold the tickets within the receiver. The passages 32*b* and 32*c* are coupled to passages 32*d* and 32*e* which in turn are coupled to passages 33 opening at the bottom of the turret hub 34 coupled to the drive shaft 34A.**

Figure 6:
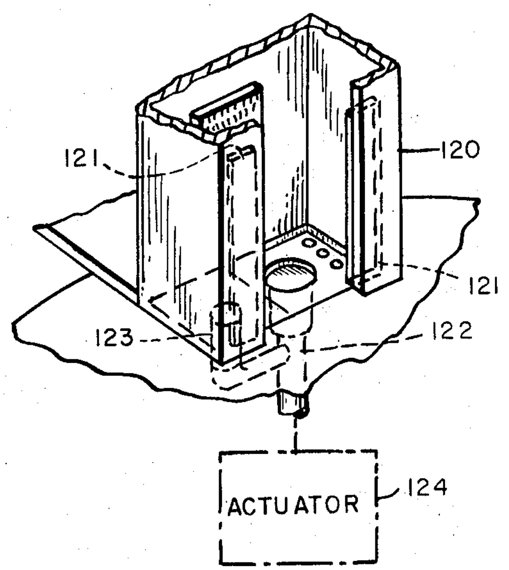
FIG. 6 shows a perspective view of an input stacker suitable for use in this invention.
Figure 9:
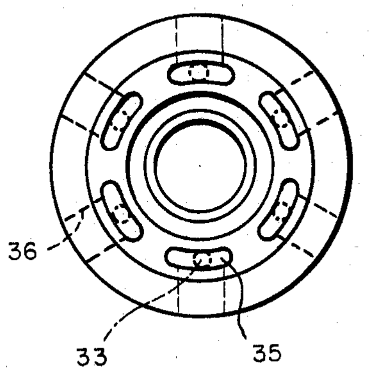
FIG. 9 is a view showing a top view of a coupling for coupling the turret to a source of vacuum.

As shown in FIG. 9 the passages 34 (shown dotted) positioned on top of coupling member 35 having passages 36 and 37 for coupling to a vacuum source. In this manner vacuum is provided to retain tickets in the ticket receivers 32. Positioned in the ticket receivers 32 at 38 there is preferably provided a padding such as of rubber having a plurality of holes 39 to permit the application of vacuum from the passage 32b. In the new and improved turret construction shown there is provided two holes 40 and 41 in the receiver. The holes 40 and 41 are provided for permitting a pusher such as shown in FIG. 6 to lift a ticket into a stacker whereas the hole 41 is also shaped such that the array 22 of holes 21 in ticket 20 shown at FIG. 2B may be illuminated by a light source such as shown in FIG. 7.

Reference should now be had to FIGS. 1, 3, 4 and 5 which illustrate at 50 an input stacker which is coupled to the machine casing or base 30 by means (not shown) so that tickets may be picked up by the ticket receivers 32.

The stacker includes slicer or gating members 51 extending downwardly towards the turret. Tickets such as 10 or 20 are fed into the receivers one at a time. The tickets normally ride on top of the turret 31 and enter an empty receiver when one is positioned under the input stacker. The receiver is of a depth *d* from the top surface 31a such that only one ticket at a time may enter a receiver and pass under the slicer members 51. When a receiver 31 is not present under the stacker, the slicers 51 extend a sufficient distance downwardly towards the turret so that tickets riding on the turret can not escape past them.

Figure 1:
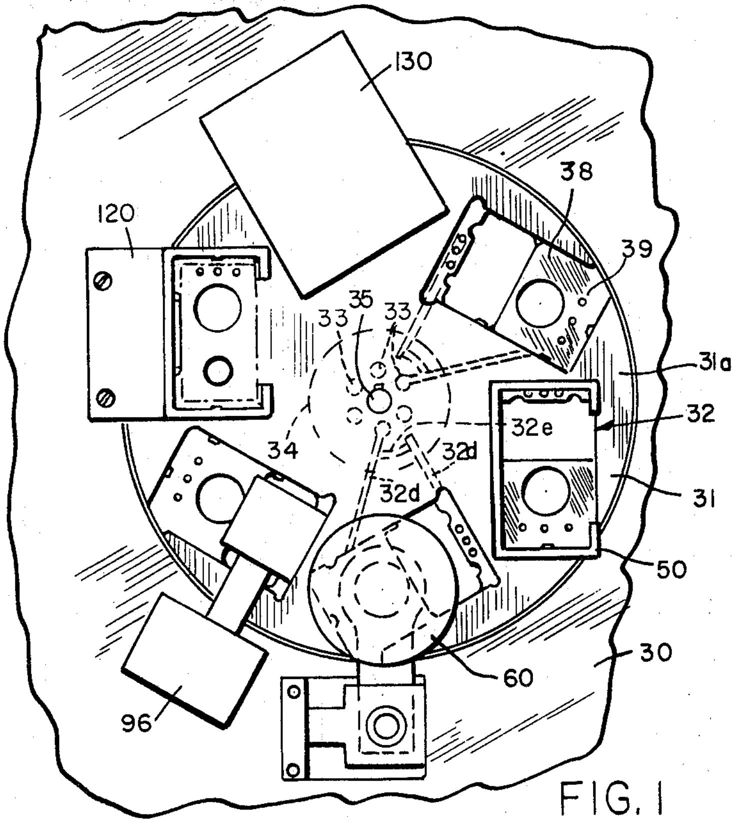
FIG. 1 is a top plan showing the construction of the reader including the relationship of feed, reading and stacking mechanisms thereof according to the invention.
Figure 7:
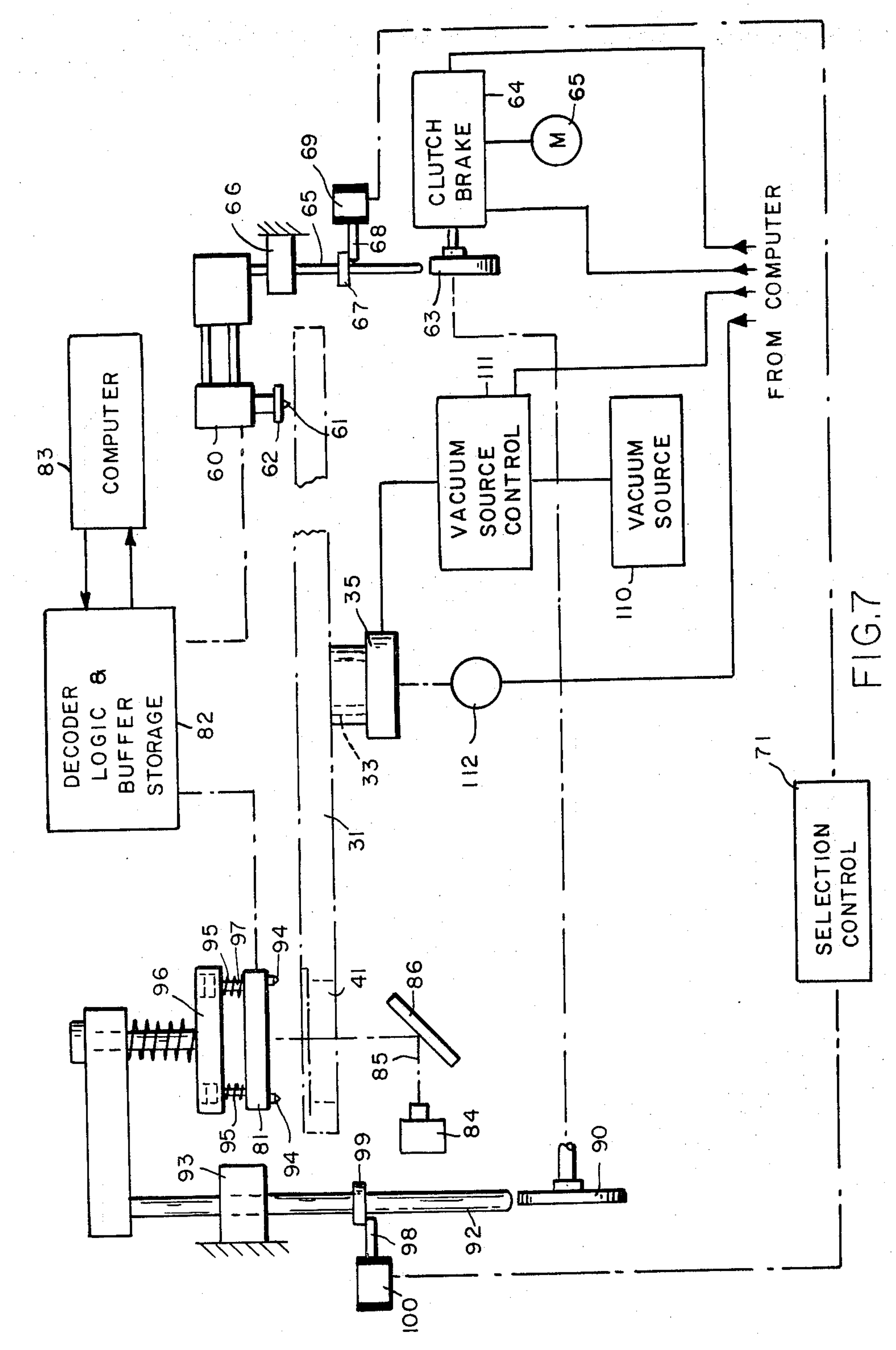
FIG. 7 is a diagrammatic view illustrating the means for reading punched coded tickets.

Reference should now be had to FIGS. 1 and 7 which illustrate at 60 a device for reading data magnetically recorded on the ticket 10. Reference may be had to the aforementioned patents and patent application for a more detailed description of the magnetic reading device.

The magnetic reader includes a member 61 for centering the ticket in the receiver so that it may be read by rotatable read heads 62. Again reference may be had to U.S. Pat. No. 3,517,612 and the aforementioned patent applications for a more detailed description, if desired.

The magnetic reading device 60 is raised and lowered by way of a cam 63 which is driven through a clutch-brake 64 and motor 65. The cam 63 drives cam follower 65 which is supported by supporting member 66. The cam follower is normally kept in a raised condition by the provision of a collar 67 coupled to the cam follower which in turn is engaged by a rod 68 as shown.

The rod 68 is solenoid activated, that is withdrawn by the action of a solenoid 69 controlled by a selection control 71. The selection control comprises switch means for causing said bar 68 to withdraw if tickets as shown in FIG. 2A are to be read. The clutch-brake mechanism is controlled in a conventional manner or as disclosed in the aforementioned patent application U.S. Ser. No. 56,281 in FIG. 13 thereof by a computer to raise and lower the member 60 to read a ticket.

Figure 8:
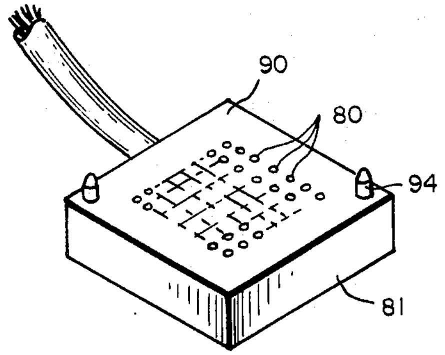
FIG. 8 is a perspective view showing the bottom of the reading head or detection means according to the invention.

Reference should now be had to FIGS. 1, 7 and 8 for a description of the optical reading device for reading the punched code of the ticket shown in FIG. 2B. The device comprises an array of photo electric detectors, each shown at 80 of the conventional type e.g., transistor or diodes with each of the detectors being positioned in a support member 81 so that light passing through all the places for holes in array 22 on the ticket 20 of FIG. 2B may be detected. The output of the detectors 80 is then converted using conventional decoder logic and buffer storage 82 to the desired output. For example, the logic can comprise diode or transistor logic commonly used to convert from binary to binary coded decimal modified depending upon the coding of the punches and flip-flops may be used as the buffer storage. As for example, a print out may be obtained or the data may be fed directly into a computer memory of a computer 83.

At 84 there is shown a light source which is supported by the reader base 30 which directs illumination 85 against a mirror 86 also supported by the reader base 30 and then through the opening 41 in a receiver 32 positioned under the detectors 80.

The light passing through the holes 21 in the ticket 20 are then detected as shown. In order to move the detectors towards and away from the turret 31 there is provided a cam 90 coupled to the clutch-brake 64 and the motor 65. The cam 90 drives a cam follower 92 supported by a member 93.

The support member 81 also includes two preferably pointed locating members 94 for engaging two of the holes 23 to center the ticket 20 with respect to the detectors 80. The support member 81 is preferably mounted by pins 95 on a support member 96 and is urged downwardly as shown by springs 97. The support 81 is spring mounted in the manner shown so that if the holes 23 are significantly misaligned additional holes will not be made in the ticket 20. Also as shown the member 97 is spring loaded to prevent damage if the reader were to accidently be forced against the turret with no receiver 32 present.

At 98 there is provided a bar for maintaining the cam follower 92 in a raised position by engaging a collar 99 attached thereto. The bar 98 is controlled by a solenoid 100 via the selection control device 71. Thus depending upon which type of ticket is to be read, the selection control switch will cause one of the bars 68 or 98 to be withdrawn. The control 71 may be a simple switch to energize either one of the solenoids 69 or 100.

At 110 there is shown a vacuum source which may be controlled through a vacuum source control 111 such as shown in U.S. Patent application U.S. Ser. No. 56,281 to apply vacuum to maintain the tickets on the receivers 32. If desired, vacuum may be relieved as shown in the aforementioned patent application to aid in centering the tickets while on the receiver.

An indexing device such as a motor and clutch-brake 112 is also provided to rotate the turret 31 as shown in the aforementioned U.S. application Ser. No. 56,281.

Reference should now be had to FIGS. 1 and 6 which shows a stacker 120 having holding fibers 121, for example of polyethylene at an angle so that they extend upwardly, for capturing tickets pushed therein by the action of the pushers 122 and 123 which extend through holes 40 and 41. The pushers 122 and 123 are actuated by an actuator 124 which in turn is controlled by the computer as shown in the aforementioned patent application. A weight (not shown) usually is placed within the stacker 120 to facilitate collection of the tickets. In FIG. 1 there is shown a deflector 130 as in the aforementioned patent application FIG. 10 which cooperates with pushers of the type 122 and 123 to expel tickets after they have been successfully read. The stacker 120 is primarily used to retain tickets which were not read because they were remarked, as for example by altering the price thereon. In order to indicate remarking of a ticket areas of the ticket are provided with circled areas for the placement of a mark e.g. pencil to indicate that the ticket has been remarked. A remark detection feature may be included in this reader using the scheme as shown in U.S. Pat.

No. 3,604,899 and would utilize holes shown at 125 and 126 formed in the disc and opening at the bottom of the receiver (see FIGS. 3 and 4) for directing and then collecting light reflected from the area of the ticket upon which remarking is to be indicated. The pad 38 (see FIG. 1) would also include holes aligned with holes 125 and 126 to permit the passage of light.

The tickets of this invention are used in merchandising of clothing etc., are well known in the art and usually store thereon price and inventory information.

We claim:

1. A ticket reader having a plurality of stations at which a ticket is processed, the reader constructed to read two types of tickets, one type bearing magnetically encoded data and the other type bearing punch encoded data, said reader comprising a disc including top planar surface, bottom and side surfaces and having a plurality of ticket receivers set into and positioned about said top surface thereof, said ticket receivers shaped to receive both types of tickets such that the major surfaces thereof are substantially parallel to said disc top surface and support one side of each ticket type at a station so that the data encoded on both ticket types may be read while one type of ticket is supported in the same shaped ticket receiver, means for rotating the disc between stations, means for stopping the disc to sequentially position said ticket receivers one at a time at a different one of said stations, means for placing tickets into the ticket receivers at one of said stations, first reading means positioned at another of said stations and spaced apart from said disc top surface for reading data magnetically encoded on a ticket carried by one of said ticket receivers after being moved into contact with a ticket supported by one of said ticket receivers, and second reading means positioned at a different one of said stations than said first means and spaced apart from said disc top surface for reading punch encoded data on a ticket after being moved into contact with a ticket supported by one of said ticket receivers.

2. A ticket reader according to claim 1 in which control means is provided for moving one of said first and second reading means into position with respect to a ticket held by one of said ticket receivers to read data encoded on a ticket.

3. A ticket reader according to claim 1 in which each of said ticket receivers has a bottom surface below the top surface of the disc, vacuum directing means within the disc and opening at the bottom surface of the receiver for applying suction at the bottom surface of the receiver to retain tickets within the receiver, first and second ejector holes extending from said bottom surface of said disc and ending as openings at the bottom surface of the receiver at a point removed from the opening of said vacuum directing means, said second ejector hole of a size to permit light to be directed at the entire portion of a punch encoded ticket containing punch encoded data while supported by said receiver.

4. A ticket reader according to claim 3 in which said second reading means comprises light source means for directing light through said second ejector hole in said ticket receiver and detecting means for detecting light passing through the same second ejector hole in said ticket receiver.

5. A ticket reader according to claim 4 in which means are provided for raising and lowering said detection means away from and towards said disc in order to read tickets carried by a ticket receiver.

6. A ticket reader according to claim 5 in which positioning means are provided as a part of the detection means for locating a ticket with respect to said second ejector hole in said receiver for passing light from said light source means.

7. A ticket reader according to claim 6 in which the locating means are spring biased so as to prevent holes from being produced in said ticket during the step of locating the ticket.

8. A ticket reader according to claim 3 in which means is provided for lowering and raising said first and second reading means towards and away from said disc, and in which means is provided for permitting one of said first and second reading means to move towards said disc.

9. A ticket reader according to claim 3 in which a rubber padding is positioned over a portion of the bottom of each of the receivers about the first ejector hole, said padding being provided with a plurality of holes therethrough in register with the vacuum directing means.

10. A ticket reader according to claim 9 in which the vacuum directing means open into the bottom of the receivers at points located adjacent to opposite sides of the second ejector hole.

11. A ticket reader according to claim 10 in which means is provided for lowering and raising said first and second reading means towards and away from said disc, and in which means is provided for permitting one of said first and second reading means to move towards said disc.

12. In a machine for receiving a punched encoded ticket at a first station and then reading said ticket at a second station, the combination comprising a disc having a planar top surface, bottom and side surfaces, a plurality of ticket receivers set into said top surface of said disc, said ticket receivers each having wall guide means between which a ticket to be carried is received, each of said receivers having a bottom surface, means for retaining a ticket within said receivers, each of said receivers having first and second ejector holes beginning at the bottom surface of the receivers and opening at the bottom surface of the disc, means for rotating the disc and stopping the disc at said first station in order to receive a ticket and then at a second station in order to read punched data stored in a ticket, and punch code reading means positioned adjacent the second station and comprising a light source for directing light through said second ejector hole in the ticket receiver in order to impinge upon a ticket having a punch encoded portion, said ticket being supported in a ticket receiver such that the major surfaces thereof are substantially parallel to said disc top surface with the ticket punch encoded portion confined and positioned over and between wall means defining said second ejector hole, and detection means positionable to detect light passing through said second ejector hole and said punch encoded portion of the ticket being held by the ticket receiver.

13. In a machine according to claim 12 in which means is provided for raising and lowering said detection means towards the ticket receiver to detect light passing through the punch encoded holes of the ticket.

14. In a machine according to claim 13 in which means are provided for entering said two ejector holes of said receiver to raise said ticket out of said receiver after said ticket has been read.

15. In a machine according to claim 12 in which said second ejector hole is shaped to permit light to impinge upon the punched coded portion of ticket.

16. In a machine according to claim 13 in which means are provided for preventing said detection means from being lowered toward the ticket receiver.

17. In a machine according to claim 12 in which the disc is provided with a pair of light directing holes extending from the bottom surface of the disc and opening at the bottom surface of the ticket receiver at a point spaced apart from said first and second ejector holes to permit light to pass into the disc through one of said light directing holes and impinge upon one side of a ticket held in a receiver and then be reflected by the ticket back out of said disc through the other of said light directing holes so that differences in light reflection by different portions of the ticket may be detected.

* * * * *